United States Patent [19]

McMinn

[11] Patent Number: 4,617,711

[45] Date of Patent: Oct. 21, 1986

[54] METHOD AND APPARATUS FOR REPAIRING AUTOMATIC TRANSMISSIONS

[76] Inventor: William D. McMinn, 42215 52nd St. W., Quartz Hill, Calif. 93534

[21] Appl. No.: 535,590

[22] Filed: Sep. 26, 1983

[51] Int. Cl.$^4$ .......................... B23P 7/00; B60K 17/00
[52] U.S. Cl. .................................. 29/402.08; 180/70.1
[58] Field of Search ......................... 29/402.08, 402.02; 180/70.1

[56] References Cited

U.S. PATENT DOCUMENTS 3,747,196 7/1973 Whittington ..................... 29/402.12

OTHER PUBLICATIONS

"Hydraulic Drive", *Audels New Automobile Guide* ©1942, pp. 746–(36–41), Theo Audel & Co., Publishers, 49 West 23rd St., N.Y.

Motor Auto Repair Manual, 47th Ed. ©1983, 1st printing, publ. by Motor, 555 W. 57th St., N.Y. 10019.

Chilton's Auto Repair Manual, 1985, US & Cdn. 78–85, ©1984, published by Chilton Book Co., Radnor, Pa. 19089.

*Primary Examiner*—Howard N. Goldberg
*Assistant Examiner*—Vernon K. Rising
*Attorney, Agent, or Firm*—Blakely, Sokoloff, Taylor & Zafman

[57] ABSTRACT

In automatic transmissions for use in automobiles and other vehicles, the shaft on the forward pump cover is generally sealed with respect to the direct clutch housing by way of split seal rings, each fitting within an appropriate groove on the pump cover shaft. In most transmissions, these seal rings are cast iron rings elastically deformed during assembly and expanding outward in use to locate on and spin with the pump cover shaft. In one specific transmission, these seal rings are Teflon rings which cannot be replaced by cast iron rings, as cast iron rings do not have adequate elasticity to allow compression of the ring sufficient to pass through the direct clutch drum bushing without breaking the ring. In accordance with the present invention, that bushing is replaced with a different form of bushing, whereby the diameter of the bushing journal is substantially increased, thereby eliminating the need for excessive elastic deflection of the seal rings during assembly and allowing the replacement of the Teflon rings with suitable cast iron rings. Various forms of the invention are disclosed.

14 Claims, 7 Drawing Figures

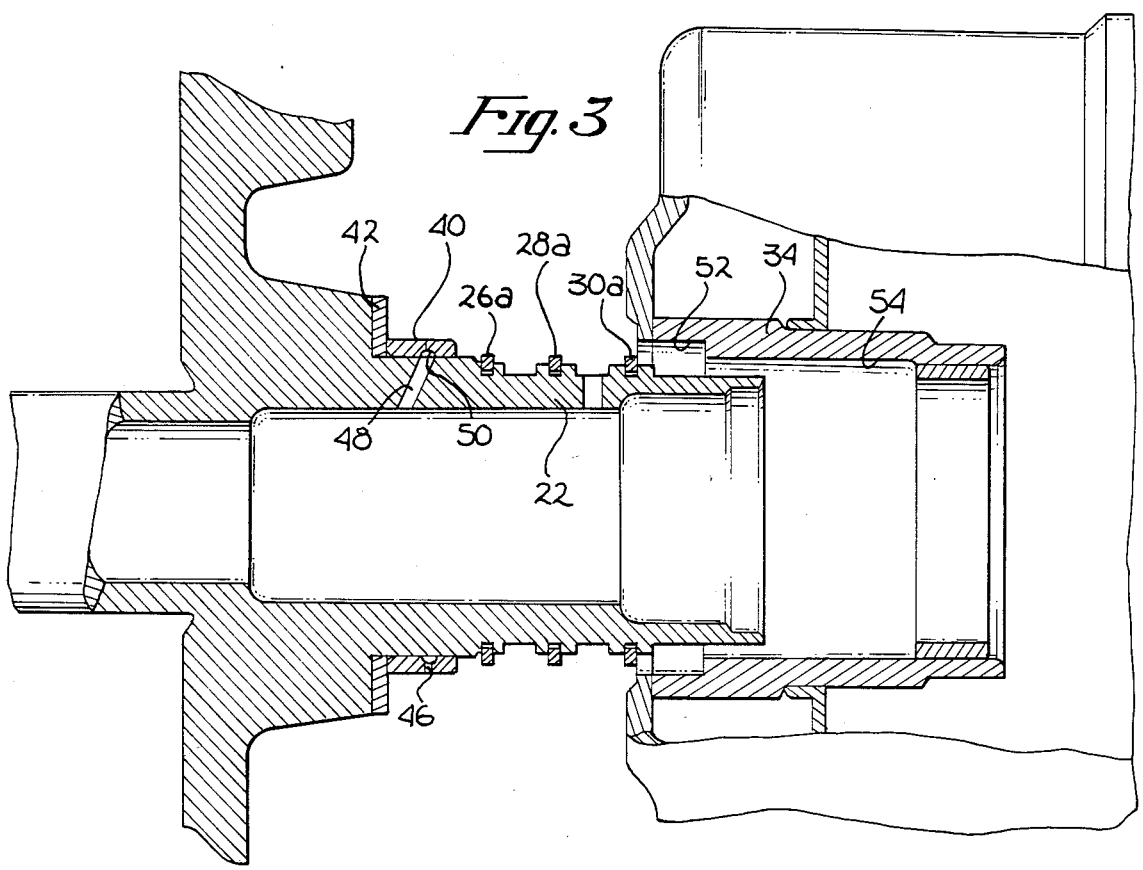
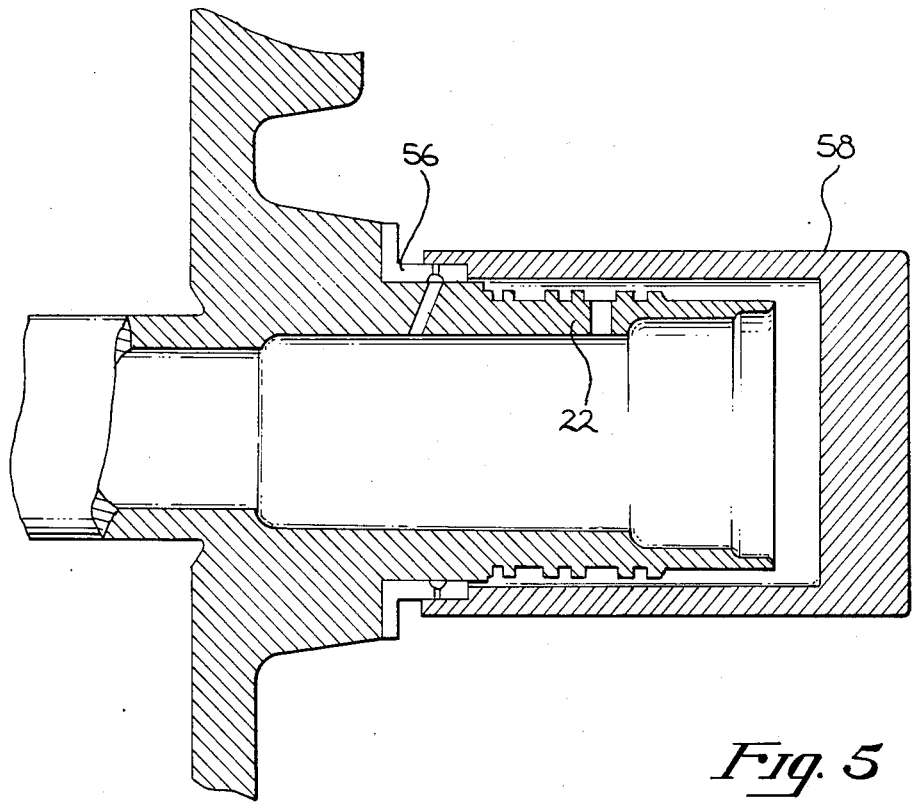

METHOD AND APPARATUS FOR REPAIRING AUTOMATIC TRANSMISSIONS

BACKGROUND OF THE INVENTION

1. Field of the Invention

The present invention relates to the field of automatic transmission repair.

2. Prior Art

Automatic transmissions as are generally used in passenger vehicles usually incorporate a forward clutch assembly just aft of the pump which, when engaged, effectively connects the torque converter shaft to the output shaft for direct drive through the transmission. The direct clutch assembly is actuated by oil pressure delivered thereto through an opening in the hollow shaft-like extension of the pump body surrounding the torque converter shaft, hereinafter referred to as the pump shaft. The pump shaft is sealed with respect to the forward clutch housing by way of oil seal rings, usually three, which locate in cooperatively disposed seal ring grooves on the pump shaft to elastically expand outward against the clutch housing journal.

In most transmissions the oil seal rings sealing the pump shaft to the clutch housing are cast iron seal rings, being split in such a manner that the two ends of the split ring overlap so as to comprise a full circle in planform. The rings are installed in the seal ring groove on the pump shaft, with the pump assembly being slid thereover during the assembly operation to elastically compress the rings, whereby once assembled the rings are firmly elastically urged against the inner diameter of the clutch housing hub. In operation the rings are intended to rotate with the clutch housing rather than with pump shaft and, together with the seal ring grooves in the pump shaft, provide a highly restricted leakage path for oil under pressure therearound so as to allow the forward clutch to operate under the intended pressure when the transmission shifts into high gear (direct drive). In essence the seal rings rotate with the clutch housing and center themselves with the seal ring groove by hydrodynamic forces so as to not be subject to any appreciable wear. Accordingly, such cast iron rings, properly installed, rarely are a cause of automatic transmission failure.

In certain transmissions, specifically the automatic 200 transmission (hereinafter referred to as the A 200 transmission) manufactured by General Motors Corporation, the pump oil seal rings are Teflon seal rings which have good flexibility and high temperature capability. However, Teflon has a far lower modulus of elasticity than cast iron, and such rings are not elastically urged firmly against the inside diameter of the pump shaft. Therefore, such rings may allow fluid leakage therearound, reducing the hydraulic pressure holding the direct clutch in engagement when in direct drive. This, in turn, may allow the transmission to slip when in high gear, causing unnecessary wear and early failure of the transmission. Any slippage which is allowed becomes particularly troublesome when driving up a long, steep incline, as the slippage under such a load for any substantial length of time will cause excessive heating in the transmission, badly burning the oil, and leading to very early failure of the direct clutch assembly or other parts of the transmission. On the other hand, if the Teflon seal rings properly seat and stay properly positioned, no substantial leakage will occur and the rings will outlive the rest of the transmission. The problem, then, is one of uniformity and reliability, as the Teflon seal rings in many transmissions will never be a cause of difficulty, whereas in others, the rings may lead to a transmission failure within the first few thousand miles of the transmission's life, or within the first few thousand miles of a transmission overhaul.

Teflon rings are used in other portions of the A 200 transmission, which rings are typically replaced with cast iron rings whenever the transmission is rebuilt by independent transmission shops using rebuild kits supplied by the various parts kit suppliers. The pump oil seal rings, however, cannot be replaced with cast iron rings for the reason that the inside diameter of the front direct clutch bushing is smaller than the inside diameter of the pump shaft on which the seal rings must ride. As a result, the parts cannot be assembled using cast iron rings without the rings breaking when passing through the inside diameter of the front direct clutch bushing. As a consequence, it has been common to replace the A 200 transmissions with automatic 350 transmissions or, alternatively, because of the shortage of the 350 transmissions, to provide a warranty on rebuilt A 200 transmissions which is only a fraction of the warranty extended by independent rebuilders to other transmissions.

BRIEF SUMMARY OF THE INVENTION

In automatic transmissions for use in automobiles and other vehicles, the shaft on the forward pump cover is generally sealed with respect to the direct clutch housing by way of split seal rings, each fitting within an appropriate groove on the pump cover shaft. In most transmissions, these seal rings are cast iron rings elastically deformed during assembly and expanding outward in use to locate on and spin with the pump cover shaft. In one specific transmission, these seal rings are Teflon rings which cannot be replaced by cast iron rings, as cast iron rings do not have adequate elasticity to allow compression of the ring sufficient to pass through the direct clutch drum bushing without breaking the ring. In accordance with the present invention, that bushing is replaced with a different form of bushing, whereby the diameter of the bushing journal is substantially increased, thereby eliminating the need for excessive elastic deflection of the seal rings during assembly and allowing the replacement of the Teflon rings with suitable cast iron rings. Various forms of the invention are disclosed.

BRIEF DESCRIPTION OF THE DRAWINGS

FIG. 3 is a partial cross section of a portion of the transmission of FIGS. 1 and 2 illustrating the manner of replacement of the front direct clutch housing bushing in accordance with the present invention.

FIG. 5 is a partial cross section of the forward pump and shaft illustrating the use of an integral front bushing and thrust washer and the manner of pressing the same onto the front shaft.

DETAILED DESCRIPTION OF THE INVENTION

Figure 1:
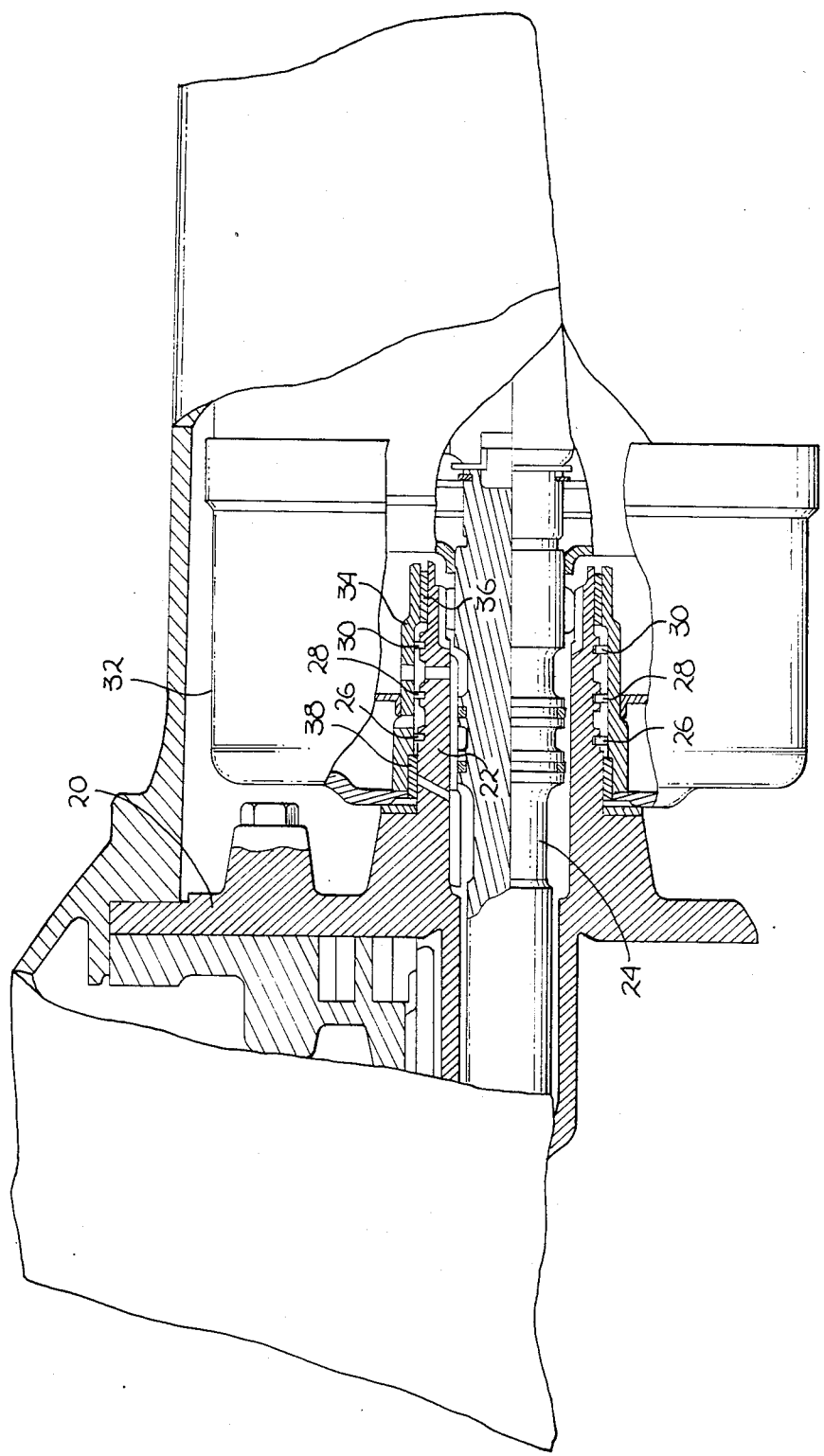
FIGS. 1 and 2 are partial cross sections of a prior art automatic transmission.

First referring to FIG. 1, a partial cross section of a part of the A 200 transmission may be seen. In general, this figure corresponds with FIG. 7A1-206 on Page 7A1-61 of the 1979 Oldsmobile chassis service manual published by General Motors Corporation, though showing less detail than in the manual. In that regard, that manual, or other equivalent manuals, provide a ready reference with respect to the A 200 transmission for which the present invention is intended. As may be seen in FIG. 1, the pump cover 20 has an integral rearward extending hollow shaft 22 through which the torque converter shaft 24 passes. The shaft 22 contains three grooves, each containing one of the oil seal rings 26, 28, and 30 to which the present invention is directed.

The direct clutch housing 32 is supported on a central hollow hub 34 by rear and front direct clutch bushings 36 and 38. By design the inside diameter of the front direct clutch bushing 38 is smaller than the inside diameter 54 of central hollow hub 34 through which the pump oil seal rings must pass. Accordingly, the amount of flexing of the rings 26, 28, and 30 which must occur during assembly for the rings to pass through bushing 38 is excessive for cast iron rings, resulting in breakage of the rings if their use is attempted.

Now referring to FIG. 3, one embodiment of the present invention can be seen. In accordance with the method of this embodiment, during repair of the transmission the front direct clutch bushing 38 (see FIGS. 1 and 2) is knocked out and discarded. A new bushing 40 is then pressed onto the pump shaft 22 (prior to installation of the oil seal rings), entrapping the pump to direct clutch thrust washer 42 in its normal position.

Figure 4:
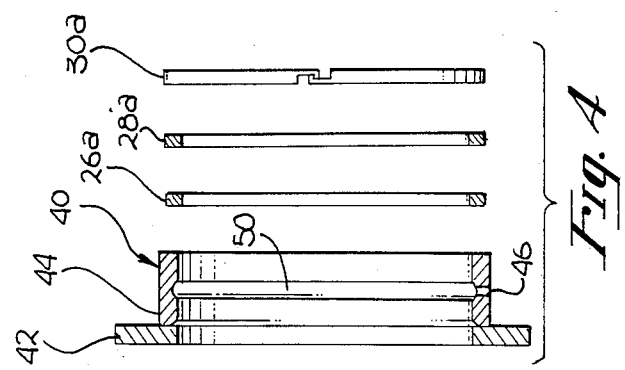
FIG. 4 shows the form of bushing and cast iron ring used in the embodiment of FIG. 3.

Details of the bushing 40 may be seen in FIG. 4. In particular, the bushing has an outer surface 44 of suitable bearing material such as brass, babbitt material or other suitable bushing material. In order to ensure proper lubrication of the bushing surface, an oil hole 46 is provided therethrough to receive transmission fluid passing through hole 48 in the pump shaft 22 for lubrication purposes. In addition, in order to avoid the requirement of accurate angular alignment of the bushing 40 with repect to the pump shaft 34 to assure alignment of the lubrication holes 46 and 48, the inside diameter of the bushing 40 is provided with an appropriately located annular relief 50 therein to provide fluid communication between the lubrication holes 46 and 48 regardless of the relative angular orientation thereof.

Figure 2:
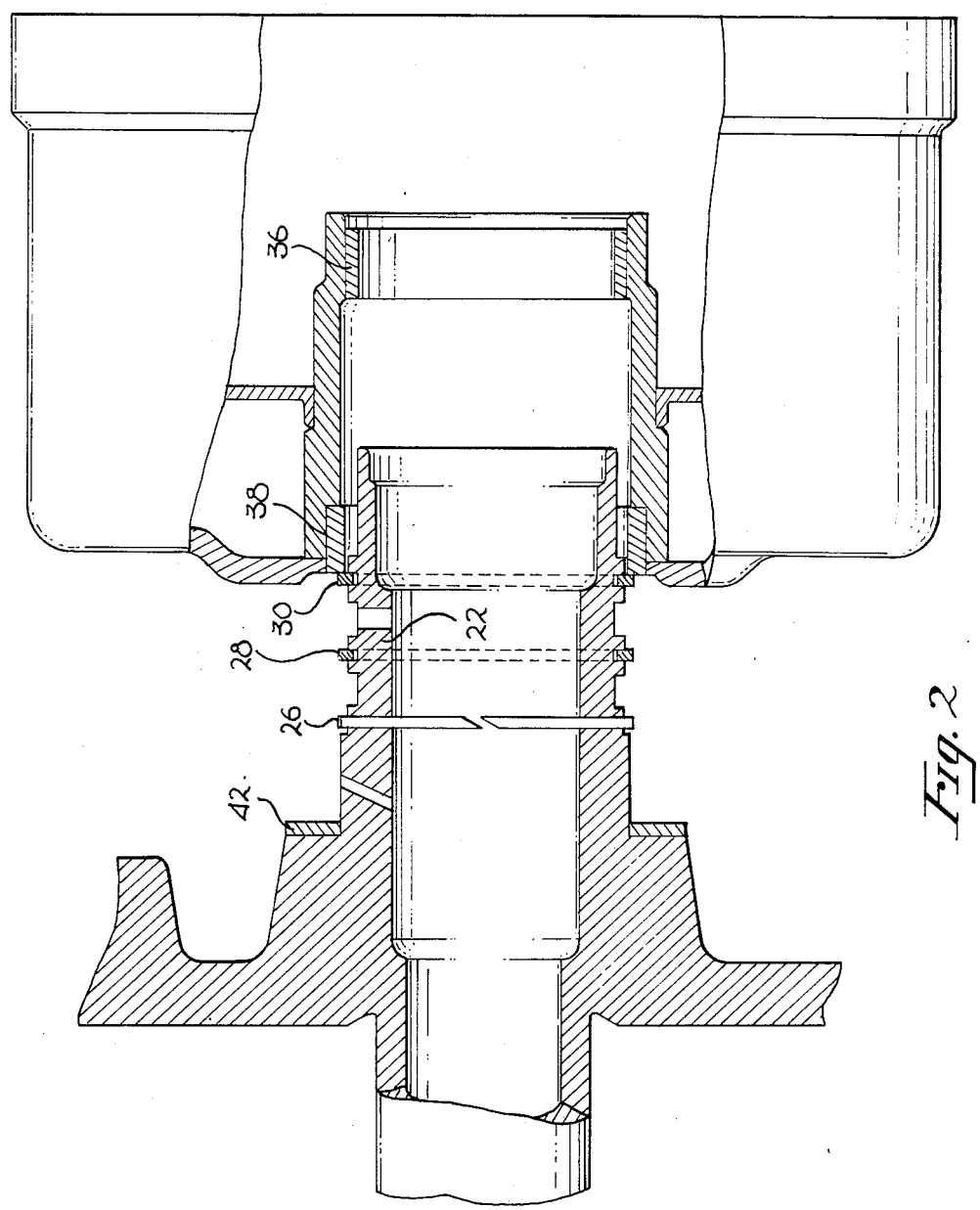

The outside diameter of bushing 40 is selected so as to act as a bearing surface in cooperation with the inside diameter of region 52 on the front of the direct clutch housing, into which bushing 38 had originally been pressed. Thus it may be seen that the net effect of the replacement of bushing 38 with bushing 40 is that the bearing surface has been moved from the surface of pump shaft 22, a relatively small diameter surface, to the surface of the inside diameter into which bushing 38 had originally been pressed. As such, the new bearing surface has a bigger diameter and a bigger area than the original bearing surface and, accordingly, provides more than an adequate net bearing surface between the front of the direct clutch housing and the pump shaft. Of particular importance, of course, is the fact that, upon assembly of the transmission, bushing 38 is no longer present so that the cast iron seal rings 26a, 28a, and 30a may be used to slide directly into the inside diameter 54 of the direct clutch housing hub 34. In that regard, it should be noted that the original equipment Teflon rings used in the A 200 transmission are split rings, split on a diagonal as is illustrated in FIG. 2 for ring 26. The cast iron rings used in the present invention, however, are split in an interlocking manner, as is illustrated for ring 30a in FIG. 4. In particular, the split ends of the rings are provided with hook-like members which effectively grasp each other to elastically maintain the ring at a diameter only a few thousandths of an inch larger than the inner diameter 54 of hub 34. This readily facilitates the assembly of the pump shaft into the direct clutch housing and, at the same time, provides the full desired expansive force of the ring against the inside diameter of the direct clutch housing when in the installed position.

The cast iron oil seal rings are fabricated in the free state wherein the ends of the rings do not overlap, thereby allowing the necessary cuts in the ends of the rings to provide the hooking, or grasping, capability. (Other metals could be used, if desired, such as spring steels, though cast iron is preferred because of its self lubricating characteristics.) In that regard, the rings are also assembled onto the pump shaft 22 prior to the hooking of the ends, so that the rings may be elastically deflected as required to pass onto the shaft and into the desired oil seal ring groove thereon. Obviously the rings are assembled onto the shaft in an order which does not require that any ring pass over a previously assembled ring. Once the rings are in the desired grooves on the pump shaft, each ring may be shifted to a somewhat eccentric position with respect to the shaft so that the ends of the rings extend away from the grooves, thereby allowing compression of the rings and hooking of the ends preparatory to the assembly step illustrated in FIG. 3. When assembled into the direct clutch housing, the small additional compression of each seal ring relieves the elastic force on the ends of the ring in favor of that full force being exerted against the inside diameter of the clutch housing hub. Further, as may be appreciated from FIG. 4, the overlapping ends of the seal rings when assembled provide minimal opportunity for fluid leakage thereby, further enhancing the sealing characteristics of such rings. This is to be compared with the split in the prior art Teflon rings, which may provide a substantial opportunity for fluid leakage thereby.

Now referring to FIG. 5, an alternate embodiment of the present invention may be seen. In particular, this embodiment is very similar to the embodiment of FIGS. 3 and 4, with the exception that the bushing 40 and the thrust washer 42 comprise a one-piece bushing and thrust member 56. Obviously the function of this part is the same as that of the bushing 50 and thrust washer 42, and the integral bushing and thrust washer 56 has no special advantage thereover other than inadvertent assembly of the bushing onto the pump shaft 22 without the washer 42 being in place is prevented. In that regard, either the integral bushing and thrust washer 56 of FIG. 5, or the bushing 40 of FIGS. 3 and 4, may readily be pressed into position by an insertion tool 58, with the pressing either being done in an arbor press or by the light tapping of a hammer or mallet. As further alternate embodiments, either the bushing 40 of FIGS. 3 and 4 or the integral bushing and thrust washer 56 of FIG. 5 may have a loose-slip fit on the pump shaft 22 and be provided with an appropriate bearing surface material so that either the inside diameter or the outside diameter of the bushing or integral bushing and thrust washer may act as the bearing surface. Such an arrangement has the advantage that the step of pressing the bushing or combined bushing and thrust washer onto the pump shaft is no longer required, and has the further advantage that if the inside diameter 52 of the direct clutch housing hub is somehow badly scored or otherwise galls or seizes the bushing or combined bushing and thrust washer, a second bearing surface is automatically provided to allow the bushing to rotate with the direct clutch housing. This configuration does require, however, that both the inside diameter surface and the outside diameter surface of the bushing member be suitable journal bearing surfaces and surface materials.

Figure 6:
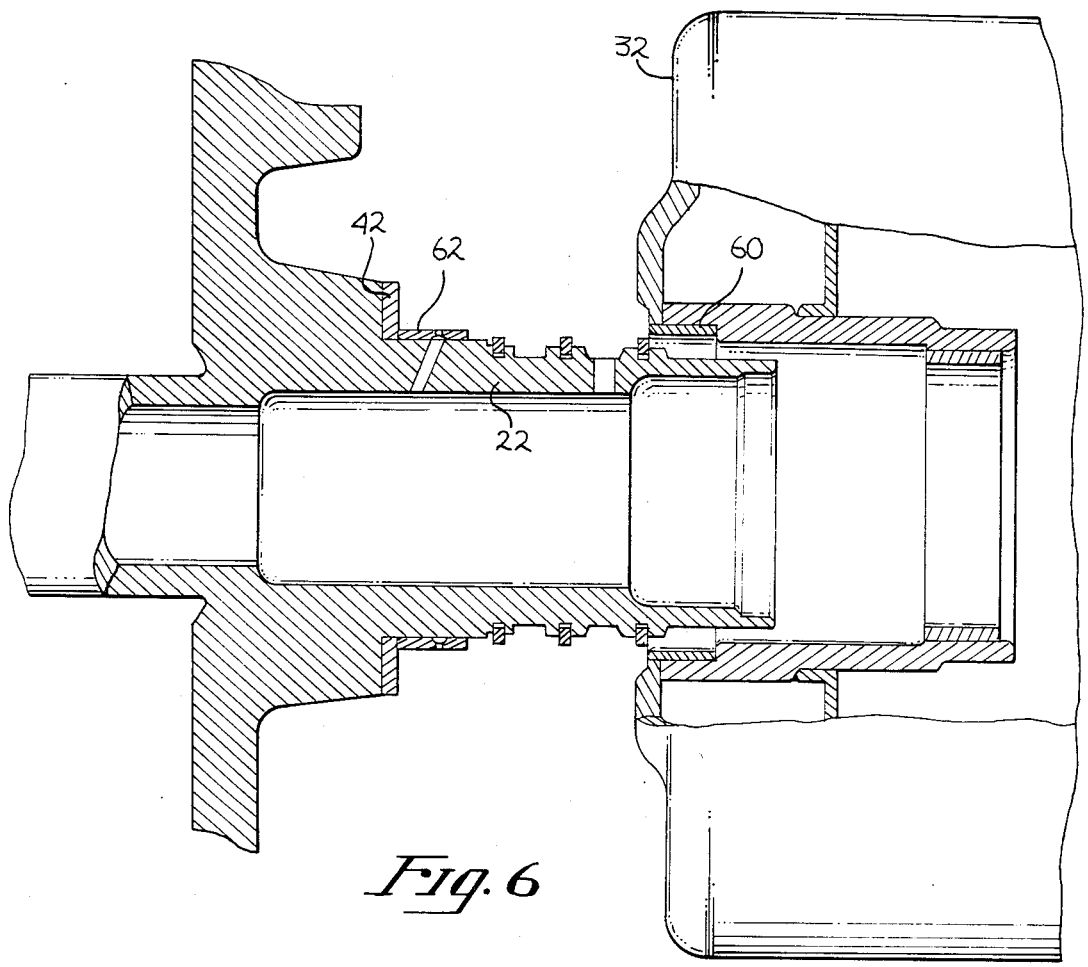
FIGS. 6 and 7 are partial cross sections illustrating a still further embodiment of the present invention.
Figure 7:
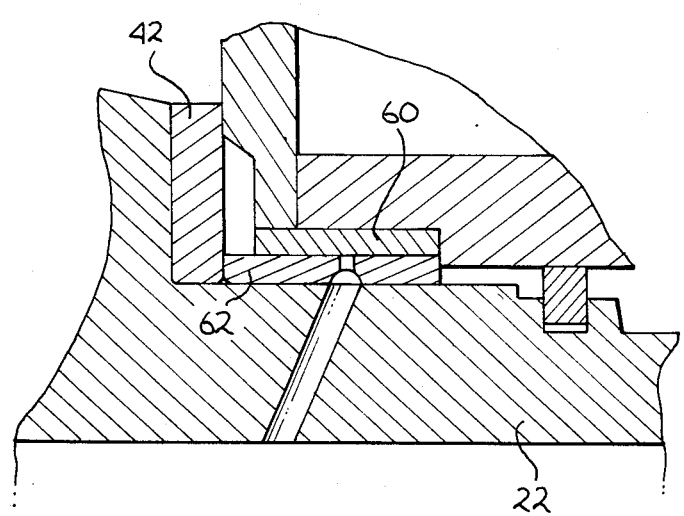

Now referring to FIGS. 6 and 7, a further alternate embodiment of the present invention can be seen. This embodiment is somewhat similar to the embodiments of FIGS. 3 and 4, though the bushing 40 of that embodiment is split between an outer bushing member 60 pressed into the direct clutch housing 32 and an inner bushing member 62 pressed onto the pump shaft 22. The inner bushing member 62 is very similar in design to the bushing 40, being of a smaller outside diameter, however, to fit within the outer bushing member 60 to provide a bearing surface therebetween. This embodiment has the advantage that both bearing surfaces may be controlled by parts provided in a repair kit, whereas the embodiments of FIGS. 3 through 5 depend, at least in part, on the quality of bearing surface provided by the inside diameter 52 of the clutch housing. It has the disadvantage, however, of requiring two bushing parts rather than merely one, each of which is relatively thin and would require greater care during assembly because of the lower structural strength thereof. In that regard, some form of lapping or polishing tool may be provided to smooth the diameter 52 on the direct clutch housing, if necessary to provide the desired bearing surface thereon. Of course, as before, particularly bushing 62 of the embodiments of FIGS. 6 and 7 (or both bushings 60 and 62) may be provided with a loose-slip fit on the mating part so as to potentially provide more than one bearing surface in the assembly.

There has been described herein new and unique apparatus and methods for repairing automatic transmissions which allow the replacement of the Teflon seal rings used in a specific prior art automatic transmission with cast iron rings to reduce the occurrence of early failure of a transmission caused by leakage of transmission fluid thereby. While various embodiments of the invention have been disclosed and described in detail herein, it will be understood by those skilled in the art that various changes in form and detail may be made therein without departing from the spirit and scope of the invention.

I claim:

1. In the repair of an automotive transmission having a direct clutch assembly supported at the front thereof by a front direct clutch bushing pressed into the front of the direct clutch housing and riding on a journal on the pump cover shaft, the pump cover shaft having a plurality of plastic seal rings in spaced apart grooves in the shaft for sealing engagement with an inside diameter of the direct clutch housing hub, the inside diameter of the direct clutch housing hub being sufficiently larger than the front direct clutch bushing so as to preclude the reliable passage of metal seal rings therethrough without cracking, breaking or permanently bending the same, the steps of (a) removing the front direct clutch bushing from the front of the direct clutch housing;

(b) removing the plastic seal rings from the pump cover shaft;

(c) installing a replacement bushing on the journal on the pump cover shaft to at least in part act as a journal bearing in cooperation with the front of the direct clutch housing from which the front direct clutch bushing was removed;

(d) installing metal seal rings in the grooves in the pump cover shaft; and (e) assembling the direct clutch housing onto the pump cover shaft.

2. The method of claim 1 wherein the metal seal rings have cooperatively shaped ends to engage each other to elastically confine each ring to a diameter only slightly larger than the diameter of the direct clutch housing hub.

3. the method of claim 1 wherein the replacement bushing installed in step (c) is pressed onto the journal.

4. The method of claim 3 wherein the replacement bushing includes an integral thrust washer.

5. The method of claim 1 wherein the replacement bushing installed in step (c) has a slip fit onto the journal, whereby the replacement bushing and the journal may, at least in part, act as a journal bearing.

6. The method of claim 5 wherein the replacement bushing includes an integral thrust washer.

7. The method of claim 1 wherein the replacement bushing has at least one hole therethrough positioned a cooperate with a lubrication hole on the pump cover shaft to provide lubrication between the replacement bushing and the front of the direct clutch bushing.

8. The method of claim 7 wherein the replacement bushing has an annular groove in its inside diameter intersecting the hole therethrough, whereby fluid communication between the lubrication hole on the pump cover shaft and the hole through the pump cover shaft is substantially independent of the angular orientation therebetween.

9. In the repair of an automotive transmission having a direct clutch assembly supported at the front thereof by a front direct clutch bushing pressed into the front of the direct clutch housing and riding on a journal on a pump cover shaft, the pump cover shaft having a plurality of plastic seal rings in spaced apart grooves in the shaft for sealing engagement with an inside diameter of the direct clutch housing hub, the inside diameter of the direct clutch housing hub being sufficiently larger than the front direct clutch bushing so as to preclude the reliable passage of metal seal rings therethrough without cracking, breaking or permanently bending the same, the steps of (a) removing the front direct clutch bushing from the front of the direct clutch housing and installing in its place a first replacement bushing having an inside diameter substantially larger than the bushing removed;

(b) removing the plastic seal rings from the pump cover shaft;

(c) installing a second replacement bushing on the journal on the pump cover shaft to at least in part act as a journal bearing in cooperation with the insider diameter bushing;

(d) installing metal seal rings in the grooves in the pump cover shaft; and (e) assembling the direct clutch housing onto the pump cover shaft.

10. The method of claim 9 wherein the metal seal rings have cooperatively shaped ends to engage each other to elastically confine each ring to a diameter only slightly larger than the diameter of the direct clutch housing hub.

11. The method of claim 9 wherein the second replacement bushing installed in step (c) is pressed onto the journal.

12. The method of claim 9 wherein the second replacement bushing installed in step (c) has a slip fit onto the journal, whereby the second replacement bushing and the journal may, at least in part, act as a journal bearing.

13. The method of claim 9 wherein the second replacement bushing has at least one hole therethrough positioned a cooperate with a lubrication hole on the pump cover shaft to provide lubrication between the first and second replacement bushings.

14. the method of claim 13 wherein the replacement bushing has an annular groove in its inside diameter intersecting the hole therethrough, whereby fluid communication between the lubrication hole on the pump cover shaft and the hole through pump cover shaft is substantially independent of the angular orientation therebetween.

* * * * *